United States Patent
Naraki

(10) Patent No.: US 9,968,917 B2
(45) Date of Patent: May 15, 2018

(54) LEV-TYPE ZEOLITE AND PRODUCTION METHOD THEREFOR

(71) Applicant: TOSOH CORPORATION, Yamaguchi (JP)

(72) Inventor: Yusuke Naraki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 205 days.

(21) Appl. No.: 14/896,185

(22) PCT Filed: Jun. 9, 2014

(86) PCT No.: PCT/JP2014/065219
§ 371 (c)(1),
(2) Date: Dec. 4, 2015

(87) PCT Pub. No.: WO2014/199945
PCT Pub. Date: Dec. 18, 2014

(65) Prior Publication Data
US 2016/0121316 A1    May 5, 2016

(30) Foreign Application Priority Data

Jun. 14, 2013 (JP) ................ 2013-126148
Jan. 16, 2014 (JP) ................ 2014-006160
Jan. 16, 2014 (JP) ................ 2014-006161

(51) Int. Cl.
| | |
|---|---|
| *B01J 29/76* | (2006.01) |
| *C01B 39/48* | (2006.01) |
| *C01B 39/06* | (2006.01) |
| *B01D 53/94* | (2006.01) |
| *B01J 29/70* | (2006.01) |
| *B01J 35/00* | (2006.01) |
| *B01J 37/08* | (2006.01) |

(52) U.S. Cl.
CPC .......... *B01J 29/76* (2013.01); *B01D 53/9418* (2013.01); *B01J 29/70* (2013.01); *B01J 35/002* (2013.01); *B01J 37/08* (2013.01); *C01B 39/06* (2013.01); *C01B 39/48* (2013.01); *B01D 2255/20761* (2013.01); *B01D 2255/50* (2013.01); *B01D 2257/404* (2013.01); *B01D 2258/012* (2013.01)

(58) Field of Classification Search
CPC .......... B01J 29/70; B01J 29/76; C01B 39/06; C01B 39/48
See application file for complete search history.

(56) References Cited

U.S. PATENT DOCUMENTS

| | | | |
|---|---|---|---|
| 4,495,303 A | 1/1985 | Kuehl | |
| 2011/0182790 A1 | 7/2011 | Chandler et al. | |

FOREIGN PATENT DOCUMENTS

| | | |
|---|---|---|
| CN | 103124694 | 5/2013 |
| EP | 0 040 016 | 11/1981 |
| EP | 0 255 770 | 2/1988 |
| EP | 0 804 959 | 11/1997 |
| JP | 63-40718 | 2/1988 |
| JP | 9-38464 | 2/1997 |
| JP | 2012-505744 | 3/2012 |
| WO | 2008/132452 | 11/2008 |
| WO | 2010/043891 | 4/2010 |
| WO | 2011/045252 | 4/2011 |
| WO | 2011/158218 | 12/2011 |

OTHER PUBLICATIONS

Dib et al, "Structure Directing agent governs the location of silanol diefects in zeolites", Chem. Mater, (2015) pp. 7577-7579.*
S. Shibata et al., "FAU-LEV interzeolite conversion in fluoride media, Microporous and Mesoprous Materials", , 2011, pp. 32-39, vol. 138.
R.A. Hearmon et al., "The protonation state of adamantanamine template after high-silica zeolite synthesis, studied by 13C solid-sate n.m.r.", Zeolites, 1990, pp. 608-611.
International Search Report issued in PCT/JP2014/065219, dated Sep. 2, 2014.

* cited by examiner

*Primary Examiner* — David M Brunsman
(74) *Attorney, Agent, or Firm* — Greenblum & Bernstein, P.L.C.

(57) ABSTRACT

The present invention provides an LEV-type zeolite which is less likely than a conventional LEV-type zeolite to have reduced zeolite crystallinity even when exposed to high-temperature, high-humidity environments, particularly high-temperature, high-humidity environments of at least 700° C. The LEV-type zeolite has a molar ratio of silica to alumina of at least 20 and a molar ratio of silanol groups to silicon of at most $1.5 \times 10^{-2}$. Such an LEV-type zeolite preferably has a silanol volume of at most $1.5 \times 10^{20}$/g.

12 Claims, No Drawings

LEV-TYPE ZEOLITE AND PRODUCTION METHOD THEREFOR

TECHNICAL FIELD

The present invention relates to a zeolite having an LEV structure. Further, the present invention relates to an LEV-type zeolite in which decreases in crystallinity are suppressed even when exposed to high temperatures, and a production method therefor.

In addition, the present invention relates to the reduction-removal of nitrogen oxides using a nitrogen oxide reduction catalyst containing a zeolite having an LEV structure. Further, the present invention relates to a zeolite having an LEV structure containing a transition metal, and a nitrogen oxide reduction catalyst containing the same.

BACKGROUND ART

Zeolites having double 6-membered rings have been studied as catalysts or adsorbents to be used in high-temperature, high-humidity environments.

In recent years, LEV-type zeolites have attracted attention as adsorbents or catalysts such as SCR catalysts for exhaust gas purification geared toward automotive use.

For example, in Patent Document 1 is disclosed an LEV-type zeolite having a silica-alumina molar ratio of from approximately 10 to approximately 300 synthesized using a quinuclidinium ion as a structure directing agent (also called an "SDA" hereafter).

In addition, in Patent Document 2 is disclosed an LEV-type zeolite synthesized using 1-adamantanamine as an SDA. The production method of this LEV-type zeolite tends to produce zeolite byproducts with a DDR structure as impurities at a high silica-alumina molar ratio. In Patent Document 2, substances reported as having a silica-alumina molar ratio of 34 includes zeolites with a DDR structure in addition to zeolites with an LEV structure. That is, in Patent Document 2, it has not been possible to produce a zeolite with a pure LEV structure having a silica-alumina ratio exceeding 25.

In addition, in Patent Document 3 is disclosed an LEV-type zeolite having a silica-alumina molar ratio of from approximately 10 to approximately 80 synthesized using a diethyl dimethyl ammonium ion as an SDA.

Further, selective catalytic reduction (called "SCR" hereafter) has been put into practical application as technology for reducing and detoxifying nitrogen oxides. Zeolites containing transition metals have thus been studied as zeolites suitable as catalysts to be used in SCR (called "SCR" catalysts hereafter).

In recent years, LEV-type zeolites have attracted attention as SCR catalysts for exhaust gas purification geared toward automotive use.

For example, in Patent Document 4 is disclosed a method using an LEV-zeolite as a method for converting nitrogen oxides to nitrogen using transition elements and small-pore zeolite having a maximum ring size based on eight tetrahedral atoms.

In addition, in Patent Document 5 is disclosed a Levyne molecular sieve containing copper and having a silica-alumina molar ratio of less than 30 and a copper-aluminum atomic ratio of less than 0.45.

CITATION LIST

Patent Literature

Patent Literature 1: European Patent No. 40016
Patent Literature 2: European Patent No. 255770
Patent Literature 3: U.S. Pat. No. 4,485,303
Patent Literature 4: WO/2008/132452 Pamphlet
Patent Literature 5: WO/2011/045252 Pamphlet

SUMMARY OF INVENTION

Technical Problem

The LEV-type zeolites disclosed in Patent Documents 1 to 3 had insufficient heat resistance—in particular, resistance to high-temperature, high-humidity environments (also called "hydrothermal resistance" hereafter).

In light of these problems, an object of the present invention is to provide an LEV-type zeolite which is less likely than a conventional LEV-type zeolite to have reduced zeolite crystallinity even when exposed to high-temperature, high-humidity environments, particularly high-temperature, high-humidity environments of at least 700° C.

Another object of the present invention is to provide a metal-containing LEV-type zeolite having hydrothermal resistance superior to that of a conventional metal-containing LEV-type zeolite. Yet another object of the present invention is to provide a metal-containing LEV-type zeolite having high nitrogen oxide reducing characteristics at low temperatures even when exposed to a high-temperature, hydrothermal environment.

Solution to Problem

The present inventors investigated decreases in crystallinity of LEV-type zeolites in high-temperature, high-humidity environments (also called "hydrothermal environments" hereafter) and the collapsing behavior of the crystal structure originating from such decreases. As a result, the present inventors discovered that decreases in the crystallinity of an LEV-type zeolite at a high temperature and high humidity are suppressed by controlling the content of silanol groups contained in the LEV-type zeolite.

Further, the present inventors discovered that by positioning a metal in a specific 6-membered ring out of the 6-membered ring structure contained in the structure of an LEV-type zeolite, the degradation of the LEV-type zeolite is suppressed even when exposed to a high-temperature, hydrothermal environment. In addition, the present inventors focused attention on the silanol of a metal-containing LEV-type zeolite and discovered that degradation is suppressed by controlling the silanol even when exposed to a high-temperature, hydrothermal environment. Further, the present inventors discovered that such a metal-containing LEV-type zeolite is unlikely to undergo a decrease in nitrogen oxide reducing characteristics, that there are minimal changes in the nitrogen oxide reducing characteristics even after being exposed to a high-temperature, hydrothermal environment, and that the metal-containing LEV-type zeolite has high nitrogen oxide reducing characteristics at low temperatures. The present inventors thereby completed the present invention.

That is, the gist of the present invention is as follows.

[1] An LEV-type zeolite having a molar ratio of silica to alumina of at least 20 and a molar ratio of silanol groups to silicon of at most $1.5 \times 10^{-2}$.

[2] The LEV-type zeolite according to [1], wherein a silanol volume is at most $1.5 \times 10^{20}$/g.

[3] The LEV-type zeolite according to [1] or [2], wherein the LEV-type zeolite is at least one type selected from the group consisting of Nu-3, ZK-20, LZ-132, LZ-133, ZSM-45, RUB-50, and SSZ-17.

[4] The LEV-type zeolite according to any one of [1] to [3] comprising a transition metal.

[5] The LEV-type zeolite according to [4] comprising a transition metal in a distorted single 6-membered ring.

[6] The LEV-type zeolite according to [4] or [5], wherein at least 50 mol % of the transition metal is present in a distorted single 6-membered ring.

[7] The LEV-type zeolite according to any one of [4] to [6], wherein a relative silanol volume is at most 2.5.

[8] The LEV-type zeolite according to any one of [4] to [7], wherein the transition metal is at least one type selected from the group consisting of groups 8, 9, 10, and 11 of the periodic table.

[9] A method for producing the LEV-type zeolite described in any one of [1] to [8], the method comprising a crystallization step of crystallizing a raw material composition containing a silica source, an alumina source, an alkali source, and a structure directing agent; a ratio of an alkali metal to the structure directing agent being at least 0.2; and a molar ratio of silica to alumina being at least 10 in the raw material composition.

[10] The method for producing an LEV-type zeolite described in [9], wherein the structure directing agent is at least any one selected from the group consisting of primary amines, secondary amines, and tertiary amines.

[11] The method for producing an LEV-type zeolite described in [9] or [10], wherein the structure directing agent is 1-adamantanamine or a salt thereof.

[12] The method for producing an LEV-type zeolite described in any one of [9] to [11], wherein the raw material composition has the following molar composition:
$SiO_2/Al_2O_3$ ratio: at least 25 and less than 60;
$H_2O/SiO_2$ ratio: at least 5 and less than 50; and
M/SDA ratio: at least 0.2 and at most 2.0.

[13] The method for producing an LEV-type zeolite described in any one of [9] to [12], the method further comprising a metal adding step for adding a transition metal to an LEV-type zeolite and a calcination step for calcining the LEV-type zeolite after the metal adding step.

[14] A catalyst comprising the LEV-type zeolite described in any one of [1] to [8].

[15] A method for reducing and removing nitrogen oxides using the catalyst described in [14].

The LEV-type zeolite of the present invention will be described hereinafter.

The present invention relates an LEV-type zeolite. An LEV-type zeolite is a zeolite having an LEV structure and more particularly an aluminosilicate having an LEV structure.

An aluminosilicate contains a structure comprising a network of repeating units of aluminum (Al) and silicon (Si) mediated by oxygen (O) (also called a "network structure" hereafter) and contains a silanol group (Si—OH) in the framework thereof at the terminals of the network structure or the ends of defects or the like (called "framework ends" hereafter).

An LEV structure is a structure resulting in an LEV-type composition according to the IUPAC structure code prescribed by the Structure Commission of the International Zeolite Association ("IZA" hereafter).

An LEV structure is a structure belonging to the ABC-6 family (simply called the "family" hereafter) defined by the Structure Commission of the International Zeolite Association. Here, A, B, and C each refer to a hexagonal cyclic structure comprising six oxygen atoms, or a so-called 6-membered oxygen ring (also simply called a "6-membered ring" hereafter).

An LEV structure is a structure represented by AABC-CABBC. More specifically, an LEV structure is a structure having a 6-membered ring in which two 6-membered rings are continuously bonded in the C-axis direction (called "a double 6-membered ring; D6R" hereafter), a 6-membered ring in which a single 6-membered ring is formed independently in the C-axis direction (called a "planar single 6-membered ring; PS6R" hereafter), and a 6-membered ring in which a single 6-membered ring is formed independently in a direction other than the C-axis direction (called a "distorted single 6-membered ring; DS6R" hereafter). In this way, an LEV structure is a structure having three types of 6-membered rings including a double 6-membered ring, a planar single 6-membered ring, and a distorted single 6-membered ring. A CHA structure, which is a structure classified in the family, is represented by AABBCC. This structure is a structure having only a double 6-membered ring as a 6-membered ring, and it does not contain a planar single 6-membered ring or a distorted single 6-membered ring.

The LEV-type zeolite is preferably at least one type selected from the group consisting of Nu-3, ZK-20, LZ-132, LZ-133, ZSM-45, RUB-50, and SSZ-17, and is more preferably Nu-3.

The molar ratio of silanol groups to silicon contained in the LEV-type zeolite of the present invention (called the "SiOH/Si ratio" hereafter) is at most $1.5 \times 10^{-2}$ and more preferably at most $1.0 \times 10^{-2}$.

The amount of silanol groups (called the "silanol volume" hereafter) contained in the LEV-type zeolite tends to increase as the amount of silicon contained in the zeolite increases. Therefore, a zeolite having a molar ratio of silica to alumina (called the "$SiO_2/Al_2O_3$ ratio" hereafter) of at most 5 (called a "low-silica zeolite" hereafter) tends to have a lower silanol volume than a zeolite having a $SiO_2/Al_2O_3$ ratio exceeding 5 (called a "high-silica zeolite" hereafter). However, since the $SiO_2/Al_2O_3$ ratio is low, a low-silica zeolite has a lower heat resistance than a high-silica zeolite and is therefore unsuitable for applications at high temperatures.

The LEV-type zeolite of the present invention is a high-silica zeolite while maintaining a low silanol volume. As a result, the LEV-type zeolite of the present invention is less likely to undergo decreases in crystallinity even when exposed to high temperatures and to high-temperature, high-humidity environments. The SiOH/Si ratio is preferably at most $0.7 \times 10^{-2}$ and more preferably at most $0.5 \times 10^{-2}$.

The SiOH/Si ratio of an LEV-type zeolite can be determined from the silanol volume determined from the 1H MAS NMR spectrum with respect to the silicon content of the LEV-type zeolite. In the present invention, the silicon content of the LEV-type zeolite can be determined by an ICP method or another form of composition analysis. In addition, the silanol volume can be determined from the 1H MAS NMR spectrum. An example of a way to determine the silanol volume is to perform 1H MAS NMR measurements on a dehydrated LEV-type zeolite and then calculating the silanol volume from the resulting 1H MAS NMR spectrum using a calibration curve method.

A more specific method for measuring the silanol volume is to dehydrate the LEV-type zeolite by holding the LEV-type zeolite for five hours at 400° C. in vacuum exhaust, collecting and weighing the dehydrated LEV-type zeolite in a nitrogen atmosphere, and performing 1H MAS NMR measurements. The silanol volume in the LEV-type zeolite can be determined by a calibration curve method from the area intensity of peaks (peaks of 2.0±0.5 ppm) belonging to silanol groups in the 1H MAS NMR spectrum obtained by the aforementioned measurements.

The LEV-type zeolite of the present invention preferably has a $SiO_2/Al_2O_3$ ratio of at least 20, more preferably at least 25, and even more preferably at least 30. When the $SiO_2/Al_2O_3$ ratio is less than 20, the decrease in crystallinity at high temperatures becomes large, so the heat resistance of the LEV-type zeolite is diminished. Such an LEV-type zeolite is unsuitable for applications at high temperatures even if the silanol volume is low.

The heat resistance tends to improve as the $SiO_2/Al_2O_3$ ratio increases. In addition, the hydrothermal resistance improving effect due to a low silanol volume becomes even greater. The hydrothermal resistance improving effect is even greater when the $SiO_2/Al_2O_3$ ratio exceeds 30. The $SiO_2/Al_2O_3$ ratio is ordinarily at most 40.

As long as the LEV-type zeolite of the present invention satisfies the $SiO_2/Al_2O_3$ ratio and the SiOH/Si ratio described above, the absolute amount of silanol groups contained in the LEV-type zeolite is not limited. The silanol volume of the LEV-type zeolite of the present invention is preferably at most $1.5 \times 10^{20}$/g (at most $2.56 \times 10^4$ mol/g), more preferably at most $1.0 \times 10^{20}$/g (at most $1.66 \times 10^4$ mol/g), even more preferably at most $0.9 \times 10^{20}$/g (at most $1.50 \times 10^4$ mol/g), even more preferably at most $0.8 \times 10^{20}$/g (at most $1.33 \times 10^4$ mol/g), and even more preferably at most $0.7 \times 10^{20}$/g (at most $1.16 \times 10^4$ mol/g).

When an LEV-type zeolite is exposed to a high temperature and high humidity, the collapse of the crystal structure due to amorphization, the dissociation of aluminum from the framework, or the like may occur. Since the LEV-type zeolite of the present invention has the $SiO_2/Al_2O_3$ ratio and the SiOH/Si ratio described above, not only is the crystal structure of the zeolite unlikely to collapse when exposed to a high temperature and high humidity, but decreases in solid acids are also unlikely to occur. As a result, the LEV-type zeolite of the present invention is an LEV-type zeolite having a higher heat resistance and higher hydrothermal resistance than a conventional LEV-type zeolite.

The hydrothermal resistance tends to increase as the silanol volume decreases. Since silanol groups are present at the framework ends, there does not exist an LEV-type zeolite that does not have silanol groups—that is, an LEV-type zeolite having a silanol volume of 0/g. Therefore, the silanol volume of the LEV-type zeolite of the present invention is preferably at least $0.1 \times 10^{20}$/g (at least $0.17 \times 10^4$ mol/g), more preferably at least $0.2 \times 10^{20}$/g (at least $0.33 \times 10^4$ mol/g), even more preferably at least $0.3 \times 10^{20}$/g (at least $0.50 \times 10^4$ mol/g), and even more preferably at least $0.4 \times 10^{20}$/g (at least $0.66 \times 10^4$ mol/g).

The LEV-type zeolite of the present invention preferably has the powder X-ray diffraction (called "XRD" hereafter) pattern shown below.

TABLE 1

| Lattice spacing d (Å) | Peak intensity |
| --- | --- |
| 10.1 ± 0.4 | Weak-moderate |
| 7.96 ± 0.2 | Strong |
| 7.49 ± 0.2 | Weak |
| 6.52 ± 0.11 | Strong |
| 5.47 ± 0.10 | Weak |
| 5.05 ± 0.10 | Moderate |
| 4.93 ± 0.07 | Weak |
| 4.18 ± 0.07 | Moderate |
| 3.99 ± 0.07 | Strong |
| 3.77 ± 0.07 | Weak-moderate |

TABLE 1-continued

| Lattice spacing d (Å) | Peak intensity |
| --- | --- |
| 3.52 ± 0.07 | Weak |
| 3.40 ± 0.07 | Weak |
| 3.27 ± 0.07 | Weak-moderate |
| 3.10 ± 0.07 | Moderate |
| 3.02 ± 0.07 | Weak |
| 2.80 ± 0.07 | Weak |
| 2.74 ± 0.07 | Moderate |
| 2.57 ± 0.07 | Weak |
| 2.53 ± 0.07 | Weak |
| 2.47 ± 0.07 | Weak |
| 2.35 ± 0.07 | Weak |
| 2.32 ± 0.07 | Weak |
| 2.25 ± 0.07 | Weak |
| 2.18 ± 0.07 | Weak |
| 2.13 ± 0.07 | Weak |

Here, the XRD pattern shown in Table 1 is an XRD pattern of an LEV-type zeolite containing substantially no SDA. LEV-type zeolites are ordinarily synthesized using an SDA. An LEV-type zeolite in the synthesized state (as synthesized) contains an SDA. An LEV-type zeolite containing an SDA demonstrates the XRD pattern shown in Table 2, for example.

TABLE 2

| Lattice spacing d (Å) | Peak intensity |
| --- | --- |
| 10.2 ± 0.4 | Weak |
| 7.99 ± 0.2 | Moderate |
| 6.62 ± 0.11 | Weak |
| 5.54 ± 0.10 | Weak |
| 5.09 ± 0.10 | Strong |
| 5.01 ± 0.10 | Weak |
| 4.95 ± 0.07 | Weak |
| 4.25 ± 0.07 | Weak |
| 4.15 ± 0.07 | Moderate |
| 4.04 ± 0.07 | Strong |
| 3.82 ± 0.07 | Weak |
| 3.71 ± 0.07 | Weak |
| 3.52 ± 0.07 | Weak |
| 3.42 ± 0.07 | Weak |
| 3.30 ± 0.07 | Moderate |
| 3.24 ± 0.07 | Weak |
| 3.14 ± 0.07 | Weak |
| 3.11 ± 0.07 | Moderate |
| 3.06 ± 0.07 | Moderate |
| 2.77 ± 0.07 | Moderate-strong |
| 2.56 ± 0.07 | Weak |
| 2.50 ± 0.07 | Weak |
| 2.28 ± 0.07 | Weak |
| 2.13 ± 0.07 | Weak |
| 2.12 ± 0.07 | Weak |

The LEV-type zeolite of the present invention preferably has an average particle size of at least 0.4 μm and more preferably at least 0.5 μm. When the average particle size is at least 0.4 μm, the heat resistance and hydrothermal resistance of the LEV-type zeolite of the present invention tend to increase. The average particle size is ordinarily at most 10 μm, more preferably at most 8 μm, and even more preferably at most 5 μm.

In the present invention, 100 primary particles are observed at random by SEM observation, and the average particle size can be determined from the average value of Feret's horizontal diameter of the observed primary particles.

Here, the average particle size in the present invention refers to the average particle size of primary particles. The primary particles in the present invention are particles that can be confirmed as particles of the smallest independent units in scanning electron microscope (called "SEM" hereafter) observations. Therefore, the average particle size in the present invention differs from the average particle size determined by averaging the particle sizes of particles—so-called secondary particles—observed as an aggregate of a plurality of particles in SEM observations.

The LEV-type zeolite of the present invention is an LEV-type zeolite having a small reduction in crystallinity when exposed to high-temperature, high-humidity environments, particularly high-temperature, high-humidity environments of at least 700° C. An example of a high-temperature, high-humidity environment is air containing 10 vol. % $H_2O$ at 900° C. When the exposure time to the high-temperature, high-humidity environment becomes longer, the thermal load on the zeolite becomes greater. Therefore, the collapse of the crystals of the zeolite, beginning with the dissociation of aluminum from the zeolite framework, typically tends to occur more readily as the exposure time to a high-temperature, high-humidity environment such as a hydrothermal environment becomes longer.

Since the LEV-type zeolite of the present invention has excellent hydrothermal resistance, even when exposed for two hours to air containing 10 vol. % $H_2O$ at 900° C., the crystallinity of the LEV-type zeolite after exposure with respect to the crystallinity of the LEV-type zeolite prior to exposure (called the "crystallinity residual ratio" hereafter) is at least 60%, more preferably at least 70%, and even more preferably at least 80%.

The LEV-type zeolite of the present invention may also contain transition metals. An LEV-type zeolite containing a transition metal (called a "metal-containing LEV-type zeolite" hereafter) can be used as a catalyst and particularly as a nitrogen oxide reduction catalyst.

The LEV-type zeolite of the present invention containing a transition metal (also called the "metal-containing LEV-type zeolite of the present invention" hereafter) will be described hereinafter.

The metal-containing LEV-type zeolite of the present invention has a transition metal in a distorted single 6-membered ring. This results in an LEV-type zeolite having a higher hydrothermal resistance than a conventional metal-containing LEV-type zeolite.

Here, the distorted single 6-membered ring contained in the LEV structure comprises two types of oxygen atoms including oxygen atoms constituting only the distorted single 6-membered ring (called "O1" hereafter) and oxygen atoms constituting both a distorted single 6-membered ring and a double 6-membered ring (called "O3" hereafter).

The metal-containing LEV-type zeolite of the present invention has a transition metal in a distorted single 6-membered ring but more preferably has a transition metal in the center of a distorted single 6-membered ring. By having a transition metal in the center of the distorted single 6-membered ring, the interaction between the transition metal and the LEV-type zeolite becomes even stronger. As a result, the nitrogen reduction characteristics of the metal-containing LEV-type zeolite of the present invention—in particular, the nitrogen reduction characteristics at a low temperature of 200° C. or lower—are further enhanced.

In the present invention, the "center of the distorted single 6-membered ring" is a position satisfying 2.87±0.90 Å, preferably 2.87±0.50 Å, more preferably 2.87±0.30 Å, and even more preferably 2.87±0.10 Å from O1 as well as 2.00±0.10 Å from O3 constituting the distorted single 6-membered ring. Therefore, in the metal-containing LEV-type zeolite of the present invention, the transition metal is preferably present at a distance satisfying 2.87±0.90 Å, preferably 2.87±0.50 Å, more preferably 2.87±0.30 Å, and even more preferably 2.87±0.10 Å from O1 as well as 2.00±0.10 Å from O3.

Further, the metal-containing LEV-type zeolite of the present invention more preferably has at least 50 mol %, more preferably at least 60 mol %, and even more preferably at least 65 mol % of the transition metal contained in the zeolite in the distorted single 6-membered ring. The nitrogen oxide reduction characteristics of the LEV-type zeolite—in particular, the nitrogen oxide reduction characteristics at 200° C. or lower—tend to be further enhanced as the amount of the transition metal present in the distorted single 6-membered ring increases.

The presence position and presence ratio of the transition metal of the metal-containing LEV-type zeolite of the present invention can be determined by performing Rietveld analysis on the powder X-ray diffraction pattern.

The metal-containing LEV-type zeolite of the present invention contains a transition metal. Since the zeolite contains a transition metal, an interaction is generated between the two substances. As a result, nitrogen oxide reduction characteristics are expressed. The transition metal is preferably at least one type selected from the group consisting of groups 8, 9, 10, and 11 of the periodic table, more preferably at least one type selected from the group consisting of platinum (Pt), palladium (Pd), rhodium (Rh), iron (Fe), copper (Cu), cobalt (Co), manganese (Mn), and indium (In), even more preferably at least either iron or copper, and even more preferably essentially only copper.

The LEV-type zeolite of the present invention may further contain a metal. The metal is preferably at least one type selected from the group consisting of group 2, group 3, and lanthanoid elements of the periodic table, more preferably at least one type selected from the group consisting of calcium (Ca), strontium (Sr), barium (Ba), and lanthanum (La), and even more preferably calcium.

The $SiO_2/Al_2O_3$ ratio of the metal-containing LEV-type zeolite of the present invention is preferably at least 20, more preferably at least 25, and particularly preferably at least 30. The solid acidity increase as the $SiO_2/Al_2O_3$ ratio decreases. As a result, the metal-containing LEV-type zeolite of the present invention tends to more stably retain the transition metal. The hydrothermal resistance tends to improve as the $SiO_2/Al_2O_3$ ratio increases. The hydrothermal resistance tends to improve even more readily when the $SiO_2/Al_2O_3$ ratio exceeds 30. When the $SiO_2/Al_2O_3$ ratio is at most 40, the amount of solid acidity for allowing the metal-containing LEV-type zeolite of the present invention to stably retain the transition metal becomes sufficient.

The atomic ratio of the transition metal to aluminum (called "Me/Al" hereafter) in the metal-containing LEV-type zeolite of the present invention is preferably at least 0.20 and more preferably at least 0.30. When Me/Al becomes large, the nitrogen oxide reduction rate becomes even higher. On the other hand, although the nitrogen oxide reduction rate tends to increase as Me/Al increases, the composition exhibits a practical nitrogen oxide reduction rate as long as Me/Al is at most 0.55 and more preferably at most 0.45.

The content of the transition metal in the metal-containing LEV-type zeolite of the present invention is preferably at least 1.0 wt. %, more preferably at least 1.5 wt. %, and even more preferably at least 2.0 wt. %. When the content of the transition metal is at least 1.0 wt. %, the nitrogen oxide reduction rate of the metal-containing LEV-type zeolite of the present invention tends to increase further. On the other hand, as long as the content of the transition metal is at most 5.0 wt. %, more preferably at most 4.0 wt. %, even more preferably at most 3.5 wt. %, and even more preferably at most 3.0 wt. %, side reactions between the excessive transition metal and the aluminum of the zeolite framework are unlikely to occur.

Here, the content of the transition metal (wt. %) in the present invention refers to the weight of the transition metal with respect to the dry weight of the LEV-type zeolite of the present invention. The weight of the transition metal can be determined by composition analysis or the like using an inductively coupled plasma atomic emission spectroscopy.

The amount of silanol groups (Si—OH) in the metal-containing LEV-type zeolite of the present invention is preferably small. When the content of silanol groups (called the "silanol volume" hereafter) is small, the nitrogen oxide reduction characteristics at a low temperature—in particular, the nitrogen oxide reduction characteristics at a low temperature of 150° C. or lower—tend to be enhanced even after the metal-containing LEV-type zeolite is exposed to a high-temperature, hydrothermal environment. Therefore, decreases in the nitrogen oxide reduction rate tend to be small before and after being exposed to a hydrothermal environment, which tends to produce a catalyst with a longer life.

The silanol groups contained in the LEV-type zeolite are contained at the framework ends. More specifically, silanol groups are divided into silanol groups present inside crystals as defects of the LEV-type zeolite crystals (called "internal silanol" hereafter) and silanol groups present on the out surfaces of crystals as terminals of the zeolite crystals (called "surface silanol" hereafter). The amounts of both internal silanol and surface silanol in the metal-containing LEV-type zeolite of the present invention are preferably small.

In the present invention, the silanol volume contained in the metal-containing LEV-type zeolite can be determined from the FT-IR spectrum and can be evaluated from the relative silanol volume determined from the following formula.

Relative silanol volume=(internal silanol+surface silanol)÷skeletal vibration

In the above formula, the internal silanol is the intensity of a peak having a vertex at $3720\pm2$ cm$^{-1}$ in the FT-IR spectrum; the surface silanol is the intensity of a peak having a vertex at $3738\pm2$ cm$^{-1}$; and the skeletal vibration is the intensity of a peak having a vertex at $1850\pm5$ cm$^{-1}$. The FT-IR spectrum is an infrared spectrum obtained by measuring the diffused and reflected light from the surface of a sample, preferably an FT-IR spectrum obtained by a so-called diffuse reflectance method, and more preferably an FT-IR spectrum obtained by a diffuse reflectance method with a heat chamber.

More specifically, in the above formula, the internal silanol is the intensity of a peak having a vertex at $3720\pm2$ cm$^{-1}$ when waveform separation is performed by drawing a baseline within a range of from 3100 to 3800 cm$^{-1}$ in the FT-IR spectrum after Kubelka-Munk conversion (called a "spectrum after K-M conversion" hereafter). The surface silanol is the intensity of a peak having a vertex at $3738\pm2$ cm$^{-1}$ when waveform separation is performed by drawing a baseline within a range of from 3100 to 3800 cm$^{-1}$ in the spectrum after K-M conversion. The skeletal vibration is the intensity of a peak having a vertex at $1850\pm5$ cm$^{-1}$ when a baseline is drawn within a range of from 1800 to 1950 cm$^{-1}$ in the spectrum after K-M conversion. The intensity of each peak in the FT-IR spectrum can be determined from the height of each FT-IR peak.

The relative silanol volume determined from the above formula is determined by indexing the silanol volume in the metal-containing LEV-type zeolite using the skeletal vibration of the zeolite as a reference. As a result, the silanol volume can be compared between different metal-containing LEV-type zeolites. The intensity of an FT-IR spectrum varies depending on the particle size of the sample, the aggregate state, or the like. Therefore, even if the intensities of the FT-IR spectrums of two or more different samples are compared directly, the silanol volume cannot be compared between the samples.

The relative silanol volume of the metal-containing LEV-type zeolite of the present invention is preferably small. The relative silanol volume is preferably at most 2.5, more preferably at most 2.0, and even more preferably at most 1.0. As a result, decreases in the nitrogen oxide reduction characteristics at a low temperature—in particular, decreases in the nitrogen oxide reduction characteristics at a low temperature of 150° C.—are unlikely to occur even after being exposed to a hydrothermal environment. The metal-containing LEV-type zeolite of the present invention contains a silanol group. Therefore, the relative silanol volume may be at least 0.01, more preferably at least 0.1, and even more preferably at least 0.25.

The relative silanol volume of the metal-containing LEV-type zeolite of the present invention tends to increase when exposed to a high-temperature, hydrothermal environment. However, the rate of increase in the relative silanol volume before and after being exposed to a high-temperature, hydrothermal environment is at most 10% and more preferably at most 8%, variation therein is small. For example, the rate of increase in the relative silanol volume of the metal-containing LEV-type zeolite of the present invention before and after treatment in which air containing 10 vol. % of $H_2O$ flows at 900° C. at a space velocity (SV) of 6,000 hr$^{-1}$ may be at least 0.1% and at most 10%. As a result, the metal-containing LEV-type zeolite of the present invention tends to have stable nitrogen oxide reduction characteristics even when used in a high-temperature, hydrothermal environment for a long period of time.

There are also LEV-type zeolites in which the relative silanol volume decreases dramatically before and after exposure to a high-temperature, hydrothermal environment. One reason that the relative silanol decreases is that the amorphization progresses due to the partial collapse of the LEV structure. The nitrogen oxide reduction characteristics of such an LEV-type zeolite are markedly reduced as the LEV-type structure collapses.

The LEV-type zeolite of the present invention can be used as an adsorbent, a catalyst, or the like. In particular, the LEV-type zeolite can be used as an adsorbent or a catalyst to be used in a high-temperature environment and further as an adsorbent or a catalyst to be used in a high-temperature, high-humidity environment.

Examples of adsorbents to be used in a high-temperature environment include water adsorbents, hydrocarbon adsorbents, and nitrogen oxide adsorbents. In addition, examples of catalysts to be used in a high-temperature, high-humidity environment include oxidation catalysts for automobile exhaust gas, nitrogen oxide direct decomposition catalysts, and nitrogen oxide reduction-removal catalysts.

The metal-containing LEV-type zeolite of the present invention can be used as a nitrogen oxide reduction catalyst and, in particular, as an SCR catalyst. Further, the zeolite can be used as an SCR catalyst for a diesel automobile having an even higher exhaust gas temperature.

The metal-containing LEV-type zeolite of the present invention has high nitrogen oxide reduction characteristics and, in particular, has high nitrogen oxide reduction characteristics even after hydrothermal aging treatment.

Here, hydrothermal aging treatment refers to treatment in which air containing 10 vol. % of $H_2O$ flows at 900° C. at a space velocity (SV) of 6,000 $hr^{-1}$. The hydrothermal aging treatment time is discretionary, but the thermal load on the zeolite becomes greater when the treatment time is longer. Therefore, the collapse of the zeolite, beginning with the dissociation of aluminum from the zeolite framework, typically tends to occur more readily as the hydrothermal aging treatment becomes longer. As a result, the nitrogen oxide reduction characteristics are diminished.

Next, the production method of the LEV-type zeolite of the present invention will be described.

A synthesized LEV-type zeolite (also called a "synthetic LEV-type zeolite" hereafter) is obtained as a result of the crystallization of a silica source and an alumina source using a structure directing agent (SDA) as a template in an alkali environment. In the crystallization process, some of the hydroxide ions ($OH^-$) present in the environment are incorporated into the crystals of the synthetic LEV-type zeolite. The incorporation of hydroxide ions in the crystallization process is thought to be affected in a complex manner by various factors such as the crystallization environment, temperature, and reaction time. Therefore, even when conditions having a reduced amount of hydroxide ions in the environment were used, for example, it was not possible to control the amount of hydroxide ions incorporated into the LEV-type zeolite obtained by crystallization.

As a result of investigating production methods for an LEV-type zeolite, the present inventors discovered that the characteristics of the SDA in the crystallization process affect the incorporating behavior of hydroxide ions. Further, the present inventors focused attention on the relationship between the SDA and an alkali metal in the raw material composition and discovered that an LEV-type zeolite in which the incorporation of hydroxide ions is suppressed is obtained by controlling these substances.

That is, the method for producing an LEV-type zeolite of the present invention is a method for producing an LEV-type zeolite comprising a crystallization step of crystallizing a raw material composition containing a silica source, an alumina source, an alkali source, and a structure directing agent; a ratio of an alkali metal to the structure directing agent being at least 0.2; and a molar ratio of silica to alumina being at least 10.

The production method of the present invention includes a crystallization step of crystallizing a raw material composition containing a silica source, an alumina source, an alkali source, and a structure directing agent. In the crystallization step, the raw material composition is crystallized, and an LEV-type zeolite is obtained.

The molar ratio of the alkali metal to the structure directing agent (SDA) (called the "M/SDA ratio" hereafter) of the raw material composition used in the crystallization step is at least 0.2, preferably at least 0.30, more preferably at least 0.33, and even more preferably at least 0.34. When the ratio of the alkali metal and the structure directing agent contained in the raw material composition is within the range described above, the incorporation of silanol groups into the LEV-type zeolite induced by the structure directing agent in the crystallization process is suppressed. One reason that the incorporation of silanol groups is suppressed may be that the ionization (cationization) of the SDA in the raw material mixture is suppressed as a result of the M/SDA ratio being within the range described above.

When the M/SDA ratio is at least 0.2, the SDA becomes unlikely to undergo ionization (cationization). As a result, in the crystallization process of the raw material composition, the incorporation of hydroxide ions, which serve as counterions of the cationized SDA, is suppressed. Further, when the M/SDA ratio is at least 0.34, it becomes easy to obtain a single phase of an LEV-type zeolite having a high molar ratio of silica to alumina ($SiO_2/Al_2O_3$ ratio) of at least 30.

On the other hand, when the M/SDA ratio is too high, it becomes difficult for crystallization to progress. Crystallization progresses as long as the M/SDA ratio is at most 2.5, more preferably at most 2.0, and even more preferably at most 0.4.

The alkali source is a compound of alkali metals and, in particular, is a compound of basic alkali metals. Specific examples of alkali sources include at least one type selected from the group consisting of sodium hydroxide, potassium hydroxide, rubidium hydroxide, and cesium hydroxide, and alkali metal components contained in at least either an alumina source or a silica source.

The SDA is at least any one selected from the group consisting of primary amines, secondary amines, and tertiary amines. These SDAs function as a template of the LEV-type zeolite not only in an ionized (cationized) state, but also without being ionized (cationized). Since the SDAs are unlikely to be ionized (cationized), the incorporation of hydroxide ions ($OH^-$) into the LEV-type zeolite during crystallization is suppressed. A specific SDA is preferably at least either 1-adamantanamine or quinuclidine. In order to further inhibit ionization (cationization), the SDA is preferably 1-adamantanamine.

These SDAs may be used directly or may be salts thereof. When the SDAs are salts, they may be inorganic salts and, more particularly, either hydrochlorides or sulfates. For example, a salt of 1-adamantanamine may be at least either 1-adamantanamine hydrochloride or 1-adamantanamine sulfate.

In the crystallization step, the molar ratio of silica to alumina ($SiO_2/Al_2O_3$ ratio) of the raw material composition is at least 10, more preferably at least 20, even more preferably at least 30, and even more preferably at least 35. The $SiO_2/Al_2O_3$ ratio of an LEV-type zeolite obtained by crystallizing the raw material composition tends to be even smaller than that of the raw material composition. Therefore, when the $SiO_2/Al_2O_3$ ratio of the raw material composition is less than 10, the $SiO_2/Al_2O_3$ ratio of the LEV-type zeolite becomes low. The resistance at high temperatures of such an LEV-type zeolite becomes markedly low, and the crystallinity in a hydrothermal environment decreased substantially.

The molar ratio of water to silica (called the "$H_2O/SiO_2$ ratio" hereafter) of the raw material composition may be at least 5 and at most 50. When the $H_2O/SiO_2$ ratio is within this range, the viscosity is such that moderate stirring is possible during crystallization.

The SDA of the raw material composition should satisfy the M/SDA ratio described above. On the other hand, the molar ratio of the SDA to silica (called the "$SDA/SiO_2$ ratio" hereafter) may be at least 0.05 and at most 0.50.

The silica source is silica ($SiO_2$) or a silicon compound serving as a precursor thereof. For example, the silica source may be at least one type selected from the group consisting of colloidal silica, amorphous silica, sodium silicate, tetraethyl orthosilicate, precipitated silica, and aluminosilicate gel, and is preferably at least either a precipitated silica or an aluminosilicate gel and more preferably a precipitated silica.

The alumina source is alumina ($Al_2O_3$) or an aluminum compound serving as a precursor thereof. For example, at least one type selected from the group consisting of aluminum sulfate, sodium aluminate, aluminum hydroxide, aluminum chloride, aluminosilicate gel, and metal aluminum can be used. When the silica source is an aluminosilicate gel, it may also serve as an alumina source.

The raw material composition preferably contains the above and has the following composition.

$SiO_2/Al_2O_3$ ratio: at least 25 and less than 60;
$H_2O/SiO_2$ ratio: at least 5 and less than 50;
M/SDA ratio: at least 0.2 and at most 2.0.

Further, the raw material composition more preferably has the following composition.

$SiO_2/Al_2O_3$ ratio: at least 30 and less than 40;
$H_2O/SiO_2$ ratio: at least 5 and less than 30;
M/SDA ratio: at least 0.33 and at most 0.9.

Each ratio in the above composition is a molar (mol) ratio, wherein M is an alkali metal and SDA is a structure directing agent. In addition, the SDA is 1-adamantanamine.

Further, the raw material composition may also contain a seed crystal. This makes crystallization more efficient. The seed crystal is a zeolite having a double 6-membered ring in the zeolite framework and may be least one type selected from the group consisting of an LEV-type zeolite, a CHA-type zeolite, and an FAU-type zeolite, and it is more preferably at least either an LEV-type zeolite or a CHA-type zeolite. A more preferable seed crystal is at least one type of zeolite selected from the group consisting of Nu-3, ZK-20, LZ-132, LZ-133, ZSM-45, SSZ-17, RUB-50, and natural levynite, and Nu-3 is even more preferable.

When the raw material composition contains a seed crystal, the seed crystal contained in the raw material composition may be contained in an amount of at least 0.05 wt. % and at most 20 wt. % with respect to the weight of $SiO_2$ in the raw material composition.

As long as the raw material composition is crystallized in the crystallization step, the crystallization method thereof may be selected as needed. A preferable crystallization method is to perform hydrothermal treatment on the raw material composition. Hydrothermal treatment may comprise placing the raw material composition in an airtight, pressure-resistant container and then heating the container. The following may be used as hydrothermal treatment conditions.

Treatment temperature: any temperature of at least 100° C. and at most 200° C., preferably at least 150° C. and at most 190° C., and more preferably at least 170° C. and at most 180° C.

Treatment time: at least 2 hours and at most 500 hours, and preferably at least 10 hours and at most 300 hours Treatment pressure: autogenous pressure The raw material composition in the crystallization step may be in a static state or in a stirred state. In order for the composition of the resulting LEV-type zeolite to be more uniform, crystallization is preferably performed in a state in which the raw material composition is stirred.

The production method of an LEV-type zeolite of the present invention may include one or more steps such as a washing step, a drying step, an SDA removal step, an ammonium treatment step, or a heat treatment step after the crystallization step.

In the washing step, the LEV-type zeolite and the liquid phase after crystallization are subjected to solid-liquid separation. In the washing step, solid-liquid separation is performed with a known method, and the LEV-type zeolite obtained as a solid phase is washed with purified water.

In the drying step, the water content is removed from the LEV-type zeolite after the crystallization step or after the washing step. The conditions of the drying step are discretionary, but an example is drying the LEV-type zeolite after the crystallization step or after the washing step by leaving the zeolite to stand for at least two hours in the atmosphere at a temperature of at least 100° C. and at most 150° C., or drying the zeolite with a spray dryer.

In the SDA removal step, the SDA contained in the LEV-type zeolite is removed. Ordinarily, an LEV-type zeolite having been subjected to a crystallization step contains a SDA in the pores thereof. Therefore, this can be removed as necessary.

The SDA removal step can be performed with any method as long as the SDA is removed. Examples of these removal methods include at least one type of treatment method from the group consisting of liquid phase treatment using an acidic aqueous solution, exchange treatment using a resin or the like, thermolysis treatment, and calcination treatment. From the perspective of production efficiency, the SDA removal step is either thermolysis treatment or calcination treatment.

The ammonium treatment step is performed in order to remove alkali metals contained in the LEV-type zeolite. The ammonium treatment step may be performed with a typical method. For example, the step may be performed by bringing an aqueous solution containing ammonium ions into contact with the LEV-type zeolite.

In the heat treatment step, heat treatment is performed on the LEV-type zeolite at a temperature of at least 400° C. and at most 600° C. In the case of an LEV-type zeolite in which the cation type is an ammonium-type ($NH_4^+$ type), an LEV-type zeolite in which the cation type is a proton-type ($H^+$ type) is obtained. An example of more specific calcination conditions is 1 to 2 hours at 500° C. in the atmosphere.

When the LEV-type zeolite of the present invention is a metal-containing LEV-type zeolite, it can be produced with the following production method. That is, the metal-containing LEV-type zeolite of the present invention can be produced by a method comprising a metal adding step for adding a transition metal to an LEV-type zeolite and a calcination step for calcining the LEV-type zeolite after the metal adding step.

In the metal adding step, a transition metal is added to the LEV-type zeolite.

The transition metal used in the metal adding step is preferably a compound containing at least one type of transition metal selected from the group consisting of groups 8, 9, 10, and 11 of the periodic table, more preferably a compound containing at least one type selected from the group consisting of platinum (Pt), palladium (Pd), rhodium (Rh), iron (Fe), copper (Cu), cobalt (Co), manganese (Mn), and indium (In), even more preferably a compound containing at least either iron or copper, and even more preferably a compound containing copper. The compound containing a transition metal may be at least one type selected from the group consisting of nitrates, sulfates, acetates, chlorides, complex salts, oxides, and complex oxides of these transition metals.

Examples of methods for adding a transition metal to the LEV-type zeolite include a method of mixing the LEV-type zeolite and the transition metal compound (called a "post-adding method" hereafter) and a method of crystallizing the LEV-type zeolite from a raw material mixture containing a transition metal (called a "pre-adding method" hereafter).

The post-adding method may be, for example, at least one type selected from the group consisting of an incipient wetness method, an evaporation drying method, a precipitation method, and a physical mixing method. The method of adding a transition metal by a post-adding method is preferably an incipient wetness method in that the introduction of a transition metal into the distorted single 6-membered ring in the calcination step can be easily accelerated and in that the transition metal content of the LEV-type zeolite after the metal adding step can be easily controlled.

An example of a pre-adding method is a method of crystallizing a raw material composition containing a transition metal. The raw material composition containing the transition metal may be formed by a method of mixing with a silica source, an alumina source, an alkali source, a structure directing agent, and a transition metal source, or it may be a raw material composition containing a compound containing a transition metal in any one or more of a silica source, an alumina source, an alkali source, and a structure directing agent.

The production method of the present invention includes a calcination step of calcinating the LEV-type zeolite after the metal adding step. As a result, the introduction of the transition metal contained in the LEV-type zeolite into the distorted single 6-membered ring of the LEV-type zeolite is accelerated, and the transition metal is easily positioned in the center of the distorted single 6-membered ring. This enhances the hydrothermal resistance of the metal-containing LEV-type zeolite, in particular.

As conditions for the calcination step under which the above effect is achieved, calcination may be performed at a temperature of at least 500° C., more preferably at least 550° C., even more preferably at least 600° C., even more preferably at least 700° C., even more preferably at least 800° C., and even more preferably at least 900° C. In addition, the calcination step may be performed in an environment such as the atmosphere or a hydrothermal environment, and it is preferably performed in the atmosphere (in the air). The calcination time may be set as needed, and the calcination time may be reduced when the calcination temperature is higher. An example of the calcination time is at least 1 hour and at most 24 hours.

The calcination temperature is preferably at least 700° C., more preferably at least 800° C., even more preferably at least 850° C., and even more preferably at least 900° C. since the nitrogen oxide reduction rate over a wider temperature range—for example, the nitrogen oxide reduction rate from at least 150° C. to at most 500° C.—tends to increase. An example of more preferable calcination conditions is at least 2 hours and at most 5 hours at a temperature of at least 800° C. and at most 950° C. in the atmosphere.

Advantageous Effects of Invention

With the present invention, it is possible to provide an LEV-type zeolite which is less likely than a conventional LEV-type zeolite to have reduced zeolite crystallinity even when exposed to high-temperature, high-humidity environments of at least 700° C.

Further, with the production method of the present invention, it is possible to directly synthesize an LEV-type zeolite having a low silanol volume. After the LEV-type zeolite obtained by the production method of the present invention is formed, it becomes an LEV-type zeolite having excellent hydrothermal resistance without being subjected to additional treatment to reduce the silanol volume.

The metal-containing LEV-type zeolite of the present invention has hydrothermal resistance superior to that of a conventional metal-containing LEV-type zeolite.

Even after hydrothermal aging treatment, the metal-containing LEV-type zeolite of the present invention has a high nitrogen oxide reduction rate even in a low temperature range of at most 200° C. or at most 150° C.

Further, the decrease in the nitrogen oxide reduction rate of the metal-containing LEV-type zeolite of the present invention is extremely small even when exposed to hydrothermal aging treatment and equivalent high-temperature hydrothermal environment. In addition, the nitrogen oxide reduction rate is further enhanced when the metal-containing LEV-type zeolite of the present invention is exposed to a high temperature.

The metal-containing LEV-type zeolite of the present invention can be used as a nitrogen oxide reduction catalyst, as an SCR catalyst, and as an ammonia SCR catalyst. Therefore, the metal-containing LEV-type zeolite of the present invention can be provided as a catalyst exhibiting stable nitrogen oxide reduction characteristics even when exposed to a high-temperature, hydrothermal environment for a long period of time.

EXAMPLES

The present invention will be described in detail with reference to examples hereinafter. However, the present invention is not limited to these examples.

(LEV Structure Identification and Measurement of Crystallinity)

Powder X-ray diffraction measurements were performed on a sample using a typical X-ray diffraction device (trade name: MXP-3, manufactured by Max Science). Using CuKα rays ($\lambda$=1.5405 Å) as a radiation source, measurements were taken in a step scanning measurement mode under scanning conditions of 0.04° per second over a measurement time of 3 seconds and a measurement range 2θ of from 4° to 44°.

The sample was identified by comparing the resulting powder X-ray diffraction pattern and the powder X-ray diffraction pattern of Table 1 or 2.

The crystallinity was obtained from the peak height at a lattice spacing d=4.04±0.07 for an LEV-type zeolite containing an SDA and from the peak height at a lattice spacing of 3.99±0.07 for an LEV-type zeolite containing substantially no SDA.

(Rietveld Analysis)

The total amount of copper contained in the sample, the proportion of copper present in the distorted single 6-membered ring, and the position/distance where copper is present in the distorted single 6-membered ring were determined by Rietveld analysis.

The LEV-type zeolite was heated in a vacuum for 30 minutes at 400° C. as a form of pretreatment. The sample was then evaluated using an X'pert PRO MPD manufactured by Spectris with an X-ray source of CuKα, an acceleration voltage of 45 kV, an X-ray tube current of 40 mA, an operation rate of 2θ=0.02 deg/sec, a sampling interval of 0.017 deg, an automatic variable slit (irradiation width: 10 mm×100 mm), and a goniometer radius of 240 mm.

The resulting XRD profile was analyzed by Rietveld analysis software (RIETAN-2000), and the proportion of copper present in the distorted single 6-membered ring and the interatomic distance between each of the atoms were calculated from the occupancy of copper obtained at each site. The crystal structure data of the LEV-type zeolite used in analysis was cited from the literature (Merlino, S., Galli, E. and Alberti, A. Tschermaks Min. Petr. Mitt., 22, 117-129 (1975).

(Silanol Group Content Measurement Method)

The content of silanol groups in the LEV-type zeolite was measured by 1H MAS NMR.

Prior to measurements, the sample was dehydrated as a form of pretreatment by holding the sample for five hours at 400° C. in vacuum exhaust. After pretreatment, the sample that was cooled to room temperature was collected and weighed in a nitrogen atmosphere. A typical NMR measurement device (device name: VXR-300S, manufactured Varian) was used as the measurement device. The measurement conditions were as follows.

Resonance frequency: 300.0 MHz
Pulse width: $\pi/2$
Measurement waiting time: 10 sec
Integration frequency: 32 times
Rotational frequency: 4 kHz
Shift standard: TMS A peak at 2.0±0.5 ppm was obtained as a peak associated with a silanol group from the resulting 1H MAS NMR spectrum. This peak was subjected to waveform separation, and the area intensity was determined. The silanol volume in the sample was determined by a calibration curve method from the resulting area intensity.

(Relative Silanol Volume Measurement Method)

The relative silanol volume was measured by FT-IR as follows. A typical FT-IR device (trade name: 660-IR, manufactured by Variana) and a heating diffuse reflection device (trade name: STJ900° C. Heating Diffuse Reflection Device, manufactured by S.T. Japan) were used for measurements. As a form of pretreatment, the sample was heated to 400° C. at 10° C./min in vacuum exhaust and then held for two hours. Measurements were taken under measurement conditions with a reference of KBr, a wavelength range of from 400 to 4000 $cm^{-1}$, a resolution of 4 $cm^{-1}$, and an integration frequency of 128 times to obtain an FT-IR spectrum.

In the resulting spectrum after K-M conversion, the intensity (peak height) of a peak having a vertex at 1850±5 $cm^{-1}$ when a baseline was drawn within a range of from 1800 to 1950 $cm^{-1}$ was determined as the skeletal vibration of the zeolite. Similarly, the intensities (peak heights) of a peak having vertices at 3720±2 $cm^{-1}$ and 3838±2 $cm^{-1}$ when waveform separation was performed by drawing a baseline within a range of from 3100 to 3800 $cm^{-1}$ in the spectrum after K-M conversion were determined as the internal silanol and the surface silanol, respectively. The relative silanol volume was determined from the internal silanol, the surface silanol, and the skeletal vibration in accordance with the following formula.

Relative silanol volume=(internal silanol+surface silanol)÷skeletal vibration (Composition Analysis)

Composition analysis was performed by an inductively coupled plasma atomic emission spectroscopy (ICP method). That is, a measurement solution was prepared by dissolving a sample in a mixed aqueous solution of hydrofluoric acid and nitric acid. The composition of the sample was analyzed by conducting measurements on the resulting measurement solution using a typical inductively coupled plasma atomic emission spectroscopy device (trade name: OPTIMA 3000DV, manufactured by PERKIN ELMER).

The molar concentration of copper (Cu) with respect to the molar concentration of aluminum (Al) was determined, and this was used as the atomic ratio of copper to aluminum.

(SiOH/Si Ratio)

The content (mol/g) of silanol groups in the LEV-type zeolite measured by 1H MAS NMR with respect to the silicon content (mol/g) in the LEV-type zeolite measured by an ICP method was determined, and this was used as the SiOH/Si ratio.

(Average Particle Size Measurement Method)

The sample was observed with a scanning electron microscope (called an "SEM" hereafter) using a typical scanning electron microscope (trade name: Model JSM-6390LV, manufactured by JEOL Ltd.). The magnification of the SEM observation was 10,000 times. One hundred primary particles were selected at random from the SEM image of the sample obtained by SEM observation, and the Feret's horizontal diameter thereof was measured. The average value of the resulting measurements was determined and used as the average particle size of the sample.

(Hydrothermal Aging Treatment)

A sample was press-molded to form agglomerates with an agglomerate size of from 12 mesh to 20 mesh. An atmospheric pressure fixed-bed flow reactor was filled with 3 mL of the agglomerate sample, and hydrothermal aging treatment was performed by flowing air containing 10 vol. % of $H_2O$ into the reactor at 300 mL/min. Hydrothermal aging treatment was performed for two hours at 900° C.

(Nitrogen Oxide Reduction Rate Measurement Method)

The nitrogen oxide reduction rate of the sample was measured with the following ammonia SCR method.

After press molding, 1.5 mL of a sample adjusted to 12 mesh to 20 mesh was measured, and a reaction tube was filled with the sample. A treatment gas of the following composition containing nitrogen oxide was then made to flow into the reaction tube at each temperature of 150° C., 200° C., 300° C., 400° C., and 500° C. Measurements were taken at a treatment gas flow rate of 1.5 L/min and a space velocity (SV) of 60,000 $hr^{-1}$.

| Treatment gas composition: | NO | 200 ppm |
| --- | --- | --- |
| | $NH_3$ | 200 ppm |
| | $O_2$ | 10 vol. % |
| | $H_2O$ | 3 vol. % |
| | Balance | $N_2$ |

The nitrogen oxide concentration (ppm) in the treatment gas after the catalyst with respect to the nitrogen oxide concentration (200 ppm) in the treatment gas flowing to the reaction tube was determined, and the nitrogen oxide reduction rate was determined in accordance with the following formula.

Nitrogen oxide reduction rate (%)={1−(nitrogen oxide concentration in treatment gas after contact/nitrogen oxide concentration in treatment gas before contact)}×100

Example 1

A reaction mixture was obtained by adding 117.3 g of purified water, 2.97 g of sodium aluminate (special grade reagent), and 8.5 g of 1-adamantanamine (special grade reagent) to 11.3 g of precipitated silica (Nipsil VN-3) and stirring the mixture. The composition of the reaction mixture was as follows in terms of molar ratios.

$SiO_2/Al_2O_3$=30
$Na/SiO_2$=0.120
$H_2O/SiO_2$=40
Na/1-adamantanamine=0.360

The resulting reaction mixture was sealed in a stainless steel autoclave and heated for 240 hours at 180° C. while rotating the autoclave to obtain a product.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the $SiO_2/Al_2O_3$ molar ratio of this example was 24, and the average particle size was 2.9 μm.

After the resulting LEV-type zeolite was calcined for two hours at 600° C. in the air, it was mixed with a 20% ammonium chloride aqueous solution. After the mixed LEV-type zeolite was filtered and washed, it was dried overnight at 110° C. in the atmosphere. As a result, an $NH_4$-type LEV-type zeolite was obtained.

The silanol volume of the resulting LEV-type zeolite was measured.

In addition, hydrothermal aging treatment was performed on the $NH_4$-type LEV-type zeolite. The crystallinity of the $NH_4$-type LEV-type zeolite after hydrothermal aging treatment with respect to the crystallinity of the $NH_4$-type LEV-type zeolite before hydrothermal aging treatment was determined, and this was used as the crystallinity residual ratio. The results are shown in Table 3.

Example 2

A reaction mixture was obtained by adding 100.7 g of purified water, 2.10 g of sodium aluminate, 0.22 g of 48% sodium hydroxide, and 7.3 g of 1-adamantanamine to 9.75 g of precipitated silica and stirring the mixture. The composition of the reaction mixture was as follows in terms of molar ratios.
$SiO_2/Al_2O_3$=36
$Na/SiO_2$=0.117
$H_2O/SiO_2$=40
Na/1-adamantanamine=0.350

The resulting reaction mixture was sealed in a stainless steel autoclave and heated for 240 hours at 180° C. while rotating the autoclave to obtain a product.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the silica-alumina molar ratio of the product was 31, and the average particle size was 4.3 μm.

The silanol content and the crystallinity residual ratio of the resulting LEV-type zeolite were measured in the same manner as in Example 1. The results are shown in Table 3.

Example 3

A reaction mixture was obtained by adding 100.0 g of purified water, 1.89 g of sodium aluminate, 0.31 g of 48% sodium hydroxide, and 7.2 g of 1-adamantanamine to 9.57 g of precipitated silica and stirring the mixture. The composition of the reaction mixture was as follows in terms of molar ratios.
$SiO_2/Al_2O_3$=40
$Na/SiO_2$=0.115
$H_2O/SiO_2$=40
Na/1-adamantanamine=0.346

After 1.01 g of the LEV-type zeolite obtained in Example 1 was added to the reaction mixture, the resulting reaction mixture was sealed in a stainless steel autoclave and heated for 240 hours at 180° C. while rotating the autoclave to obtain a product.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the silica-alumina molar ratio of the product was 33, and the average particle size was 7.0 μm.

The silanol content and the crystallinity residual ratio of the resulting LEV-type zeolite were measured in the same manner as in Example 1. The results are shown in Table 3.

Example 4

A reaction mixture was obtained by adding 100.3 g of purified water, 1.89 g of sodium aluminate, and 7.2 g of 1-adamantanamine to 9.58 g of precipitated silica and stirring the mixture. The composition of the reaction mixture was as follows in terms of molar ratios.
$SiO_2/Al_2O_3$=40
$Na/SiO_2$=0.090
$H_2O/SiO_2$=40
Na/1-adamantanamine=0.271

After 1.01 g of chabazite-type zeolite (CHA-type zeolite) was added to the reaction mixture, the resulting reaction mixture was sealed in a stainless steel autoclave and heated for 240 hours at 180° C. while rotating the autoclave to obtain a product.

A substance with a silica-alumina molar ratio of 30 was used as the chabazite-type zeolite.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the silica-alumina molar ratio of the product was 34, and the average particle size was 0.67 μm.

The silanol content and the crystallinity residual ratio of the resulting LEV-type zeolite were measured in the same manner as in Example 1. The results are shown in Table 3.

Comparative Example 1

An LEV-type zeolite using dimethyl diethyl ammonium as an SDA was synthesized. That is, 2.6 g of sodium aluminate (19.7 wt. % $Na_2O$ and 19.1% $Al_2O_3$) was dissolved in 96.6 g of a 20% solution of dimethyl diethyl ammonium hydroxide. Next, 0.68 g of a 48% sodium hydroxide solution, 0.2 g of water, and finally 19.9 g of precipitated silica were added. The reaction mixture had the following composition.
$SiO_2/Al_2O_3$=60
$(Na_2O+DMDEA_2O)/SiO_2$=0.32
$Na_2O/(Na_2O+DMDEA_2O)$=0.14

This mixture was heated for 23 days at 130° C. A sample of the product was washed by centrifugation and then dried overnight at 110° C. in the atmosphere. The product exhibited neither of the XRD patterns of Tables 1 and 2 but exhibited an XRD pattern similar to that of the LEV-type zeolite shown in Table 1 of U.S. Pat. No. 4,495,303. The silica-alumina molar ratio of the product was 27, and the average particle size was 0.31 μm.

The silanol content and the crystallinity residual ratio of the resulting LEV-type zeolite were measured in the same manner as in Example 1. The results are shown in Table 3.

Comparative Example 2

First, 0.45 g of sodium aluminate and 1.10 g of 48% sodium hydroxide were added to 6.52 g of purified water and mixed. A mixture was obtained by adding 2.86 g of precipitated silica to the mixture. The mixture was heated to 95° C., and 3.07 g of N-methyl quinuclidinium iodide was added while stirring to obtain a raw material mixture. The composition of the reaction mixture was as follows in terms of molar ratios.

$SiO_2/Al_2O_3=50$
Na/$SiO_2$=0.192
$H_2O/SiO_2$=10
N-methyl quinuclidinium/$SiO_2$=0.285

The resulting reaction mixture was sealed in a stainless steel autoclave and heated for 72 hours at 180° C. while rotating the autoclave to obtain a product.

The product was filtered, washed, and then dried overnight at 110° C. in the atmosphere. The product exhibited neither of the XRD patterns of Tables 1 and 2 but exhibited an XRD pattern similar to that of the LEV-type zeolite shown in Table 2 of U.S. Pat. No. 4,372,930. The silica-alumina molar ratio of the product was 30, and the average particle size was 0.16 μm.

The silanol content and the crystallinity residual ratio of the resulting LEV-type zeolite were measured in the same manner as in Example 1. The results are shown in Table 3.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was an LEV-type zeolite—that is, a single phase of Nu-3 not containing a phase other than the LEV-type zeolite. In addition, the $SiO_2/Al_2O_3$ ratio of this example was 24, and the average particle size was 2.9 μm. Further, the SiOH/Si ratio determined by a calibration curve method from the 1H MAS NMR spectrum of the LEV-type zeolite was $0.49\times10^{-2}$.

(Copper Loading)

The obtained LEV-type zeolite was calcined for two hours at 600° C. in the air so as to remove the 1-adamantanamine contained in the LEV-type zeolite.

After the calcined LEV-type zeolite was treated with a 20% ammonium chloride aqueous solution, it was dried overnight at 110° C. in the atmosphere. As a result, an $NH_4$-type LEV-type zeolite was obtained.

The copper loading was performed by an incipient wetness method. A copper nitrate solution was prepared by dissolving 1.3 g of copper nitrate trihydrate in 4.2 g of purified water. The copper nitrate solution was dropped into 12 g of the obtained $NH_4$-type LEV-type zeolite and mixed for five minutes with a mortar. The mixed sample was dried overnight at 110° C. The dried sample was treated by calcination for two hours at 550° C. in the air. The state of the sample after this treatment was defined as "fresh", and the sample in the state after this treatment was defined "as a fresh sample".

The obtained fresh sample had a copper content of 2.9 wt. % and a Cu/Al ratio of 0.37.

TABLE 3

| Sample | Cation type | SiOH/Si ratio | $SiO_2/Al_2O_3$ (mol/mol) | Silanol volume [$\times 10^{20}$/g] | Crystallinity residual ratio [%] |
|---|---|---|---|---|---|
| Example 1 | $NH_4$-type | $0.49 \times 10^{-2}$ | 24 | 0.46 | 73 |
| Example 2 | $NH_4$-type | $0.63 \times 10^{-2}$ | 31 | 0.60 | 95 |
| Example 3 | $NH_4$-type | $0.65 \times 10^{-2}$ | 33 | 0.62 | 94 |
| Example 4 | $NH_4$-type | $0.65 \times 10^{-2}$ | 34 | 0.62 | 95 |
| Comparative Example 1 | $NH_4$-type | $2.7 \times 10^{-2}$ | 27 | 2.55 | 0 |
| Comparative Example 2 | $NH_4$-type | $1.6 \times 10^{-2}$ | 30 | 1.54 | 22 |

It can be seen from Table 3 that the silanol group content of the LEV-type zeolite of the examples is lower than that of the comparative examples and that the crystallinity residual ratio after hydrothermal aging treatment is extremely high. As can be seen from a comparison of Examples 1 and 2, the silanol group content typically increases in step with increases in the silica-alumina molar ratio. Therefore, when the silica-alumina molar ratio of the sample of Comparative Example 1 exceeded 30, it could be predicted that the silanol group content thereof would further exceed that of Comparative Example 1. The silica-alumina molar ratio of the sample of Comparative Example 2 is 30, but the SiOH/Si ratio is greater than that of the samples of the examples, so the crystallinity residual ratio is low. As a result, it was confirmed that an LEV-type zeolite having a high hydrothermal resistance is obtained by combining the silica-alumina molar ratio and the SiOH/Si ratio.

Example 5

Production of LEV-Type Zeolite

A product was obtained with the same method as in Example 1.

(Hydrothermal Aging Treatment)

A fresh sample was press-molded to form agglomerates with an agglomerate size of from 12 mesh to 20 mesh. An atmospheric pressure fixed-bed flow reactor was filled with 3 mL of the agglomerate sample, and hydrothermal aging treatment was performed by flowing air containing 10 vol. % of $H_2O$ into the tube at 300 mL/min (space velocity of 6,000 $h^{-1}$). Hydrothermal aging treatment was performed for 1 hour, 2 hours, 4 hours, or 8 hours at 900° C.

Example 6

A product was obtained with the same method as in Example 2.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the $SiO_2/Al_2O_3$ ratio of the product was 31, and the average particle size was 4.3 μm. Further, the SiOH/Si ratio determined by a calibration curve method from the 1H MAS NMR spectrum of the LEV-type zeolite was $0.63\times10^{-2}$.

A fresh sample was obtained by mixing a sample with a copper nitrate solution and then drying and calcining the mixture with the same method as in Example 5 with the exception that a copper nitrate solution prepared by dissolving 1.1 g of copper nitrate trihydrate in 4.3 g of purified water was used.

The obtained fresh sample had a copper content of 2.4 wt. % and a Cu/Al ratio of 0.38.

Hydrothermal aging treatment was performed with the same method as in Example 5 with the exception that the copper-containing LEV-type zeolite of this example was used and that a discretionary treatment time was used. In addition, the nitrogen oxide reduction characteristics were evaluated with the same method as in Example 5 for the fresh sample and the sample after each hydrothermal aging treatment.

Example 7

A product was obtained with the same method as in Example 3.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the $SiO_2/Al_2O_3$ ratio of the product was 33, and the average particle size was 7.0 μm. Further, the SiOH/Si ratio determined by a calibration curve method from the 1H MAS NMR spectrum of the LEV-type zeolite was $0.65\times10^{-2}$.

A fresh sample was obtained by mixing a sample with a copper nitrate solution and then drying and calcining the mixture with the same method as in Example 5 with the exception that a copper nitrate solution prepared by dissolving 1.0 g of copper nitrate trihydrate in 4.3 g of purified water was used.

The obtained fresh sample had a copper content of 2.3 wt. % and a Cu/Al ratio of 0.38.

Hydrothermal aging treatment was performed with the same method as in Example 5 with the exception that the copper-containing LEV-type zeolite of this example was used and that a discretionary treatment time was used. In addition, the nitrogen oxide reduction characteristics were evaluated with the same method as in Example 5 for the fresh sample and the sample after each hydrothermal aging treatment.

Example 8

A product was obtained with the same method as in Example 4.

The product was filtered, washed, and then dried overnight at 110° C. in the atmosphere. The powder X-ray diffraction pattern of the resulting product exhibited the same powder X-ray diffraction pattern as in Table 2. As a result, it was confirmed that the product was a single phase of Nu-3 not containing a phase other than the LEV-type zeolite. In addition, the $SiO_2/Al_2O_3$ ratio of the product was 34, and the average particle size was 0.67 μm. Further, the SiOH/Si ratio determined by a calibration curve method from the 1H MAS NMR spectrum of the LEV-type zeolite was $0.65\times10^{-2}$.

A fresh sample was obtained by mixing a sample with a copper nitrate solution and then drying and calcining the mixture with the same method as in Example 5 with the exception that a copper nitrate solution prepared by dissolving 0.9 g of copper nitrate trihydrate in 4.3 g of purified water was used.

The obtained fresh sample had a copper content of 2.1 wt. % and a Cu/Al ratio of 0.35.

Hydrothermal aging treatment was performed with the same method as in Example 5 with the exception that the copper-containing LEV-type zeolite of this example was used and that an arbitrary treatment time was used. In addition, the nitrogen oxide reduction characteristics were evaluated with the same method as in Example 5 for the fresh sample and the sample after each hydrothermal aging treatment.

FT-IR measurements were taken for the fresh sample of this example and the sample after hydrothermal aging treatment, and the relative silanol volume was calculated.

Example 9

An LEV-type zeolite was obtained with the same method as in Example 5, and this was calcined, treated with a 20% ammonium chloride aqueous solution, and dried to obtain an $NH_4$-type LEV-type zeolite.

A fresh sample was obtained by mixing a sample with a copper nitrate solution and then drying and calcining the mixture with the same method as in Example 5 with the exception that a copper nitrate solution prepared by dissolving 1.8 g of copper nitrate trihydrate in 4.1 g of purified water was used. The obtained fresh sample had an $SiO_2/Al_2O_3$ ratio of 24, a copper content of 2.9 wt. %, and a Cu/Al ratio of 0.49.

Hydrothermal aging treatment was performed with the same method as in Example 5 with the exception that the copper-containing LEV-type zeolite of this example was used and that a discretionary treatment tune was used. In addition, the nitrogen oxide reduction characteristics were evaluated with the same method as in Example 5 for the fresh sample and the sample after each hydrothermal aging treatment.

Example 10

An LEV-type zeolite was obtained with the same method as in Example 8, and this was calcined, treated with a 20% ammonium chloride aqueous solution, and dried to obtain an $NH_4$-type LEV-type zeolite.

A fresh sample was obtained by mixing a sample with a copper nitrate solution and then drying and calcining the mixture with the same method as in Example 5 with the exception that a copper nitrate solution prepared by dissolving 1.2 g of copper nitrate trihydrate in 4.2 g of purified water was used. The obtained fresh sample had an $SiO_2/Al_2O_3$ ratio of 33, a copper content of 2.6 wt. %, and a Cu/Al ratio of 0.44.%.

Hydrothermal aging treatment was performed with the same method as in Example 5 with the exception that the copper-containing LEV-type zeolite of this example was used and that a discretionary treatment time was used. In addition, the nitrogen oxide reduction characteristics were evaluated with the same method as in Example 5 for the fresh sample and the sample after each hydrothermal aging treatment.

FT-IR measurements were taken for the fresh sample of this example and the sample after hydrothermal aging treatment, and the relative silanol volume was calculated.

Example 11

An LEV-type zeolite was obtained with the same method as in Example 8, and this was calcined, treated with a 20% ammonium chloride aqueous solution, and dried to obtain an $NH_4$-type LEV-type zeolite.

A fresh sample was obtained by mixing a sample with a copper nitrate solution and then drying and calcining the mixture with the same method as in Example 5 with the exception that a copper nitrate solution prepared by dissolving 1.3 g of copper nitrate trihydrate in 4.2 g of purified water was used. The obtained fresh sample had an $SiO_2/Al_2O_3$ ratio of 33, a copper content of 2.9 wt. %, and a Cu/Al ratio of 0.49.

Hydrothermal aging treatment was performed with the same method as in Example 5 with the exception that the copper-containing LEV-type zeolite of this example was used and that a discretionary treatment time was used. In addition, the nitrogen oxide reduction characteristics were evaluated with the same method as in Example 5 for the fresh sample and the sample after each hydrothermal aging treatment.

Example 12

An LEV-type zeolite was obtained with the same method as in Example 8, and this was calcined, treated with a 20% ammonium chloride aqueous solution, and dried to obtain an $NH_4$-type LEV-type zeolite.

A fresh sample was obtained by mixing a sample with a copper nitrate solution and then drying and calcining the mixture with the same method as in Example 5 with the exception that a copper nitrate solution prepared by dissolving 1.2 g of copper nitrate trihydrate in 4.2 g of purified water was used, and that the dried sample was calcined for two hours at 850° C. in the air. The state of the sample after this treatment was defined as "high-temperature fresh", and the sample in the state after this treatment was defined as a "high-temperature fresh sample". The obtained high-temperature fresh sample had an $SiO_2/Al_2O_3$ ratio of 33, a copper content of 2.6 wt. %, and a Cu/Al ratio of 0.44.

Hydrothermal aging treatment was performed with the same method as in Example 5 with the exception that the copper-containing LEV-type zeolite of this example was used and that a discretionary treatment time was used. In addition, the nitrogen oxide reduction characteristics were evaluated with the same method as in Example 5 for the high-temperature fresh sample and the sample after each hydrothermal aging treatment aging treatment.

Comparative Example 3

An LEV-type zeolite using dimethyl diethyl ammonium as an SDA was synthesized. That is, 2.6 g of sodium aluminate (19.7 wt. % $Na_2O$ and 19.1% $Al_2O_3$) was dissolved in 96.6 g of a 20% solution of dimethyl diethyl ammonium hydroxide. Next, 0.68 g of a 48% sodium hydroxide solution, 0.2 g of water, and finally 19.9 g of precipitated silica were added. The reaction mixture had the following composition.
$SiO_2/Al_2O_3=60$
$(Na_2O+DMDEA_2O)/SiO_2=0.32$
$Na_2O/(Na_2O+DMDEA_2O)=0.14$ This mixture was heated for 23 days at 130° C. A sample of the product was washed by centrifugation and then dried overnight at 110° C. in the atmosphere. The product did not exhibit the XRD pattern of Table 2 but exhibited an XRD pattern similar to that of the LEV-type zeolite shown in Table 2 of U.S. Pat. No. 4,495,303. In addition, the $SiO_2/Al_2O_3$ ratio of the product was 27, and the average particle size was 0.31 μm. Further, the SiOH/Si ratio determined by a calibration curve method from the 1H MAS NMR spectrum of the LEV-type zeolite was $2.7\times10^{-2}$.

A fresh sample was obtained by mixing a sample with a copper nitrate solution and then drying and calcining the mixture with the same method as in Example 5 with the exception that a copper nitrate solution prepared by dissolving 1.2 g of copper nitrate trihydrate in 4.2 g of purified water was used.

The obtained fresh sample had a copper content of 2.5 wt. % and a Cu/Al ratio of 0.35.

Hydrothermal aging treatment was performed with the same method as in Example 5 with the exception that the copper-containing LEV-type zeolite of this comparative example was used and that a discretionary treatment time was used. In addition, the nitrogen oxide reduction characteristics were evaluated with the same method as in Example 5 for the fresh sample and the sample after each hydrothermal aging treatment.

FT-IR measurements were taken for the fresh sample of this example and the sample after hydrothermal aging treatment, and the relative silanol volume was calculated.

Comparative Example 4

First, 0.45 g of sodium aluminate and 1.10 g of 48% sodium hydroxide were added to 6.52 g of purified water and mixed. A mixture was obtained by adding 2.86 g of precipitated silica to the mixture. The mixture was heated to 95° C., and 3.07 g of N-methyl quinuclidinium iodide was added while stirring to obtain a raw material mixture.
$SiO_2/Al_2O_3=50$
$Na/SiO_2=0.192$
$H_2O/SiO_2=10$
N-methyl quinuclidinium/$SiO_2=0.285$ The resulting reaction mixture was sealed in a stainless steel autoclave and heated for 72 hours at 180° C. while rotating the autoclave to obtain a product.

The product was filtered, washed, and then dried overnight at 110° C. in the atmosphere. The product did not exhibit the XRD pattern of Table 2 but exhibited an XRD pattern similar to that of the LEV-type zeolite shown in Table 2 of U.S. Pat. No. 4,372,930. In addition, the $SiO_2/Al_2O_3$ ratio of the product was 30, and the average particle size was 0.16 μm. Further, the SiOH/Si ratio determined by a calibration curve method from the 1H MAS NMR spectrum of the LEV-type zeolite was $1.6\times10^{-2}$.

A fresh sample was obtained by mixing a sample with a copper nitrate solution and then drying and calcining the mixture with the same method as in Example 5 with the exception that a copper nitrate solution prepared by dissolving 0.07 g of copper nitrate trihydrate in 0.28 g of purified water was used, and that the copper nitrate solution was dropped into 0.8 g of the obtained $NH_4$-type LEV-type zeolite.

The obtained fresh sample had a copper content of 2.3 wt. % and a Cu/Al ratio of 0.35.

Hydrothermal aging treatment was performed with the same method as in Example 5 with the exception that the copper-containing LEV-type zeolite of this comparative example was used and that a discretionary treatment time was used. In addition, the nitrogen oxide reduction characteristics were evaluated with the same method as in Example 5 for the fresh sample and the sample after each hydrothermal aging treatment.

The evaluation results of the examples and the comparative examples are illustrated below.

The evaluations of the fresh sample obtained in Example 5 and the sample after hydrothermal aging treatment for one hour are shown in Table 4.

TABLE 4

| Sample | | $SiO_2/Al_2O_3$ (mol/mol) | Copper content (wt. %) | | | | Distance between $Cu^*$ and O1 of distorted single 6-membered ring | Distance between $Cu^*$ and O3 of distorted single 6-membered ring |
|---|---|---|---|---|---|---|---|---|
| | | | Cu on outer edge of distorted single 6-membered ring | Cu in center of distorted single 6-membered ring | Other Cu | Total amount | | |
| Example 5 | Fresh | 24 | 2.7 | 0 | 1.2 | 3.9 | 1.88 | 2.04 |
| | 900° C., 1 hour treatment | 24 | 0 | 1.8 | 1.4 | 3.2 | 2.87 | 1.96 |

*Copper is the copper present in the distorted single 6-membered ring

It is clear from Table 4 that the copper-containing LEV-type zeolite of this example contains copper in the distorted single 6-membered ring. Further, it was determined that the copper present in the distorted single 6-membered ring is at least 50 mol % and further at least 55 mol % of the entire amount. In addition, it was confirmed that the copper in the distorted single 6-membered ring moves to the central part after hydrothermal aging treatment.

Next, for the samples obtained in Example 5, the nitrogen oxide reduction rates of the fresh sample, the sample after hydrothermal aging treatment for 1 hour (called the "1 h aged sample" hereafter), the sample after hydrothermal aging treatment for 2 hours (called the "2 h aged sample" hereafter), the sample after hydrothermal aging treatment for 4 hours (called the "4 h aged sample" hereafter), and the sample after hydrothermal aging treatment for 8 hours (called the "8 h aged sample" hereafter).

TABLE 5

| | Reaction temperature | | | | |
|---|---|---|---|---|---|
| | 150° C. | 200° C. | 300° C. | 400° C. | 500° C. |
| Fresh sample | 23 | 68 | 81 | 80 | 79 |
| 1 h aged sample | 41 | 73 | 79 | 77 | 64 |
| 2 h aged sample | 46 | 80 | 87 | 81 | 65 |
| 4 h aged sample | 39 | 76 | 82 | 80 | 68 |
| 8 h aged sample | 38 | 72 | 79 | 74 | 61 |

* The values in the table are the nitrogen oxide reduction rates (%)

It was determined from Table 5 that the nitrogen oxide reduction rate—in particular, the nitrogen oxide reduction rate at a low temperature of at least 150° C. and at most 200° C.—improves as a result of hydrothermal aging treatment.

Next, for the samples obtained in Examples 5 to 8 and the comparative examples, the nitrogen oxide reduction rates of the 2 h aged samples at 150° C., 200° C., and 300° C. are shown in Table 6.

TABLE 6

| | Reaction temperature | | |
|---|---|---|---|
| | 150° C. | 200° C. | 300° C. |
| Example 5 | 46 | 80 | 87 |
| Example 6 | 41 | 75 | 78 |
| Example 7 | 42 | 75 | 79 |
| Example 8 | 27 | 71 | 77 |

TABLE 6-continued

| | Reaction temperature | | |
|---|---|---|---|
| | 150° C. | 200° C. | 300° C. |
| Comparative Example 3 | 5 | 7 | 11 |
| Comparative Example 4 | 22 | 62 | 82 |

* The values in the table are the nitrogen oxide reduction rates (%)

The copper-containing LEV-type zeolites of the examples and the comparative examples are all copper-containing LEV-type zeolite having similar Cu/Al ratios. According to Table 6, the nitrogen oxide reduction rate at a low temperature of at most 200° C. after hydrothermal aging treatment was higher in each of the examples than that of the comparative examples. In particular, the nitrogen oxide reduction rate at 150° C. in the examples was at least 1.2 times and as much as 5 times greater than that of the comparative examples. On the other hand, the nitrogen oxide reduction rate at 300° C. in the examples was at least 7 times that of Comparative Example 3 but was equal to that of Comparative Example 4.

It was confirmed from these results that in comparison to a conventional copper-containing LEV-type zeolite, the metal-containing LEV-type zeolite of the present invention has a particularly high nitrogen oxide reduction rate at a low temperature—in particular, a low temperature of at most 200° C. and further at most 150° C.—even after being exposed to a high-temperature, high-humidity environment.

Next, for the samples obtained in Examples 5 to 9 and Comparative Example 3, the nitrogen oxide reduction rates of the fresh samples and the 2 h aged samples at 150° C., 200° C., and 300° C. are shown in Table 7.

TABLE 7

| | | Reaction temperature | | |
|---|---|---|---|---|
| | | 150° C. | 200° C. | 300° C. |
| Example 5 | Fresh sample | 23 | 68 | 81 |
| | 2 h aged sample | 46 | 80 | 87 |

TABLE 7-continued

|  |  | Reaction temperature | | |
|---|---|---|---|---|
|  |  | 150° C. | 200° C. | 300° C. |
| Example 6 | Fresh sample | 12 | 55 | 83 |
|  | 2 h aged sample | 42 | 75 | 78 |
| Example 7 | Fresh sample | 9 | 52 | 83 |
|  | 2 h aged sample | 42 | 75 | 79 |
| Example 8 | Fresh sample | 15 | 72 | 90 |
|  | 2 h aged sample | 27 | 71 | 77 |
| Example 9 | Fresh sample | 19 | 70 | 90 |
|  | 2 h aged sample | 45 | 79 | 85 |
| Comparative Example 3 | Fresh Sample | 21 | 70 | 90 |
|  | 2 h aged sample | 5 | 7 | 11 |

* The values in the table are the nitrogen oxide reduction rates (%)

It was confirmed from Table 7 that the nitrogen oxide reduction rate at a temperature of at most 200° C. does not decrease even after hydrothermal aging treatment for two hours. In contrast, in the comparative examples, the nitrogen oxide reduction rate at a temperature of at most 200° C. decreased to at most approximately ¼ after hydrothermal aging treatment for two hours. It was confirmed from these results not only that the metal-containing LEV-type zeolite have a high nitrogen oxide reduction rate, but also that the reduction in nitrogen oxide reduction characteristics in the fresh state—in particular, the nitrogen oxide reduction rate at a temperature of at most 200° C. in the fresh state—is small even after being exposed to a high temperature and high humidity.

The sample of Comparative Example 3 amorphized after hydrothermal aging treatment for two hours, and the LEV structure collapsed.

Next, for the samples obtained in Examples 5 to 8, the nitrogen oxide reduction rates of the 8 h aged samples at 150° C., 200° C., and 300° C. are shown in Table 8.

TABLE 8

|  | Reaction temperature | | |
|---|---|---|---|
|  | 150° C. | 200° C. | 300° C. |
| Example 5 | 38 | 72 | 79 |
| Example 6 | 43 | 73 | 78 |
| Example 7 | 43 | 73 | 77 |
| Example 8 | 29 | 70 | 77 |

* The values in the table are the nitrogen oxide reduction rates (%)

In each of the examples, the nitrogen oxide reduction rate at 200° C. was at least 70% even after hydrothermal aging treatment over a long period of 8 hours, and the nitrogen oxide reduction rate at 150° C. was at least 29% and further at least 35%. In addition, the nitrogen oxide reduction rate at 300° C. was at least 75%.

It was confirmed from these results that the copper-containing LEV-type zeolite of the present invention has not only nitrogen oxide reduction characteristics at a low temperature of at most 200° C., but also practical nitrogen oxide reduction characteristics at a high temperature of at least 300° C. even after being exposed to a high-temperature, high-humidity environment for a longer period of time.

Next, for the samples obtained in Examples 7, 8, 10, and 11, the nitrogen oxide reduction rates of the fresh samples and the 4 h aged samples at 150° C., 200° C., and 300° C. are shown in Table 9.

TABLE 9

|  |  | Reaction temperature | | |
|---|---|---|---|---|
|  |  | 150° C. | 200° C. | 300° C. |
| Example 7 | Fresh sample | 9 | 52 | 83 |
|  | 4 h aged sample | 41 | 72 | 78 |
| Example 8 | Fresh sample | 15 | 72 | 90 |
|  | 4 h aged sample | 29 | 72 | 77 |
| Example 10 | Fresh sample | 22 | 72 | 89 |
|  | 4 h aged sample | 36 | 75 | 83 |
| Example 11 | Fresh sample | 25 | 77 | 91 |
|  | 4 h aged sample | 41 | 79 | 85 |

* The values in the table are the nitrogen oxide reduction rates (%)

It was confirmed from Table 9 that the nitrogen oxide reduction rate at a temperature of at most 200° C. tends to increase due to increases in Cu/Al. In particular, this trend was marked at a temperature of 150° C. or lower.

Next, for the samples obtained in Examples 5 and 9, the nitrogen oxide reduction rates of the fresh samples and the 4 h aged samples at 150° C., 200° C., and 300° C. are shown in Table 10.

TABLE 10

|  |  | Reaction temperature | | |
|---|---|---|---|---|
|  |  | 150° C. | 200° C. | 300° C. |
| Example 5 | Fresh sample | 23 | 68 | 81 |
|  | 4 h aged sample | 39 | 76 | 82 |
| Example 9 | Fresh sample | 19 | 70 | 90 |
|  | 4 h aged sample | 43 | 77 | 83 |

* The values in the table are the nitrogen oxide reduction rates (%)

It was confirmed from Tables 9 and 10 that when the silica-alumina molar ratio is within the range of the present invention, regardless of the magnitude thereof, the nitrogen oxide reduction rate at a low temperature is high.

Next, for the samples obtained in Examples 5 to 11, the nitrogen oxide reduction rates of the 4 h aged samples at 400° C. and 500° C. are shown in Table 11 along with the nitrogen oxide reduction rates of the 2 h aged samples obtained in Comparative Example 3 at 400° C. and 500° C.

TABLE 11

|  |  | Reaction temperature | |
|---|---|---|---|
|  |  | 400° C. | 500° C. |
| Example 5 | Fresh sample | 80 | 79 |
|  | 4 h aged sample | 80 | 68 |
| Example 6 | Fresh sample | 82 | 82 |
|  | 4 h aged sample | 76 | 67 |
| Example 7 | Fresh sample | 84 | 84 |
|  | 4 h aged sample | 76 | 70 |
| Example 8 | Fresh sample | 87 | 84 |
|  | 4 h aged sample | 77 | 69 |
| Example 9 | Fresh sample | 87 | 83 |
|  | 4 h aged sample | 66 | 26 |
| Example 10 | Fresh sample | 86 | 77 |
|  | 4 h aged sample | 80 | 66 |
| Example 11 | Fresh sample | 88 | 77 |
|  | 4 h aged sample | 81 | 61 |
| Comparative Example 3 | Fresh sample | 88 | 82 |
|  | 2 h aged sample | 14 | 24 |

* The values in the table are the nitrogen oxide reduction rates (%)

The nitrogen oxide reduction rates in the fresh samples at 400° C. were all at least 80%. The nitrogen oxide reduction rates of the 4 h aged samples of the examples at 400° C. were at least 60%, at least 70%, and further at least 80%. In contrast, in Comparative Example 3, the nitrogen oxide reduction rate of the 2 h aged sample at 400° C. was 14%.

Next, the nitrogen oxide reduction rates of the fresh sample of Example 10 and the high-temperature fresh sample of Example 12 at 150° C., 200° C., and 300° C. are shown in Table 12.

TABLE 12

|  | Reaction temperature | | |
| --- | --- | --- | --- |
|  | 150° C. | 200° C. | 300° C. |
| Example 10 | 22 | 72 | 89 |
| Example 12 | 42 | 86 | 95 |

* The values in the table are the nitrogen oxide reduction rates (%)

Examples 10 and 12 were obtained with the same methods with the exception of the calcination conditions. The nitrogen oxide reduction rate of Example 12 at 300° C. was approximately 1.06 times that of Example 10. On the other hand, the nitrogen oxide reduction rate of Example 12 at 150° C. was at least 1.9 times that of Example 10. It can be seen from Table 12 that a metal-containing LEV-type zeolite calcined at a higher temperature has a higher nitrogen oxide reduction rate and that the nitrogen oxide reduction rate is higher at lower temperatures.

Next, the nitrogen oxide reduction rates of the 4 h aged samples of Examples 10 and 12 at 150° C., 200° C., and 300° C. are shown in Table 13.

TABLE 13

|  | Reaction temperature | | |
| --- | --- | --- | --- |
|  | 150° C. | 200° C. | 300° C. |
| Example 10 | 36 | 75 | 83 |
| Example 12 | 47 | 83 | 92 |

* The values in the table are the nitrogen oxide reduction rates (%)

It was confirmed from Table 13 that the sample after aging treatment also has a higher nitrogen oxide reduction rate in Example 12 than in Example 10. It can be seen from Tables 12 and 13 that calcining at a higher temperature yields a higher nitrogen oxide reduction rate and, in particular, a higher nitrogen oxide reduction rate at a lower temperature both before and after aging treatment.

It was confirmed from these results that the metal-containing LEV-type zeolite of the present invention has not only a high nitrogen oxide reduction rate at a low temperature of at most 200° C. and further at most 150° C., but also a high nitrogen oxide reduction characteristics at a temperature of at least 400° C., and that the nitrogen oxide reduction rates at both low temperatures and high temperatures do not decrease even after being exposed to a high temperature and high humidity for a long period of time.

Next, the relative silanol volumes of the fresh samples of Example 10 and Comparative Examples 3 and 4 are shown in Table 14.

TABLE 14

| Fresh sample | Relative silanol volume |
| --- | --- |
| Example 10 | 0.78 |
| Comparative Example 3 | 6.43 |
| Comparative Example 4 | 2.52 |

Whereas the relative silanol volume exceeded 2.5 in Comparative Examples 3 and 4, the relative silanol volume was at most 1.0 in Example 10. It was confirmed from these results that the proportion of silanol groups in the zeolite framework is low in the metal-containing LEV-type zeolite of the present invention.

Next, the relative silanol volumes of the fresh sample and the 2 h aged sample of Example 10 are shown in Table 15.

TABLE 15

| Example 10 | Relative silanol volume |
| --- | --- |
| Fresh sample | 0.78 |
| 2 h aged sample | 0.83 |

It was confirmed from Table 15 that the relative silanol volume is 6% higher in the 2 h aged sample than in the fresh sample. It was confirmed from this result that the relative silanol volume tends to increase due to hydrothermal aging treatment.

Next, the relative silanol volumes of the 2 h aging treatment samples of Examples 6, 8, and 10 are shown in Table 16.

TABLE 16

| 2 h aged sample | Relative silanol volume |
| --- | --- |
| Example 5 | 0.29 |
| Example 6 | 0.66 |
| Example 8 | 0.59 |
| Example 10 | 0.83 |

It was confirmed from Table 16 that in each of the samples, the relative silanol volume is at most 1.0 and further at most 0.85, and that the metal-containing LEV-type zeolite of the present invention has a low relative silanol volume even after hydrothermal aging treatment.

INDUSTRIAL APPLICABILITY

The LEV-type zeolite of the present invention can be used as an adsorbent or a catalyst, and particularly as an adsorbent or catalyst to be used at a high temperature. The zeolite can be used as a catalyst to be incorporated into an exhaust gas treatment system. In particular, the LEV-type zeolite of the present invention can be used as an SCR catalyst for removing nitrogen oxides in exhaust gas of automobiles—diesel automobiles, in particular—in the presence of a reducing agent, and further as an SCR catalyst formed integrally with a DPF.

Further, the metal-containing LEV-type zeolite of the present invention can be used as a catalyst to be incorporated into an exhaust gas treatment system. In particular, the metal-containing LEV-type zeolite of the present invention can be used as an SCR catalyst for removing nitrogen oxides in exhaust gas of automobiles—diesel automobiles, in particular—in the presence of a reducing agent, and further as an SCR catalyst formed integrally with a DPF.

The present invention has been described in detail with reference to specific embodiments, but, it is obvious for a person skilled in the art that various changes and modifications are possible without departing from the intention and the scope of the present invention.

All of the content of the specifications, scopes of patent claims, drawings, and abstracts of Japanese Patent Application No. 2013-126148 filed on Jun. 14, 2013, Japanese Patent Application No. 2014-006160 filed on Jan. 16, 2014, and Japanese Patent Application No. 2014-006161 filed on Jan. 16, 2014 is cited here and incorporated as a disclosure of the specification of the present invention.

The invention claimed is:

1. An LEV-type zeolite having a molar ratio of silica to alumina of at least 25 and a molar ratio of silanol groups to silicon of at most $1.5 \times 10^{-2}$.

2. The LEV-type zeolite according to claim 1, wherein a silanol volume is at most $1.5 \times 10^{20}$/g.

3. The LEV-type zeolite according to claim 1, wherein the LEV-type zeolite is at least one type selected from the group consisting of Nu-3, ZK-20, LZ-132, LZ-133, ZSM-45, RUB-50, and SSZ-17.

4. The LEV-type zeolite according to claim 1 comprising a transition metal.

5. The LEV-type zeolite according to claim 4 comprising a transition metal in a distorted single 6-membered ring.

6. The LEV-type zeolite according to claim 4, wherein at least 50 mol % of the transition metal is present in a distorted single 6-membered ring.

7. The LEV-type zeolite according to claim 4, wherein a relative silanol volume is at most 2.5.

8. The LEV-type zeolite according to claim 4, wherein the transition metal is at least one type selected from the group consisting of groups 8, 9, 10, and 11 of the periodic table.

9. A method for producing the LEV-type zeolite described in claim 1, the method comprising crystallizing a raw material composition containing a silica source, an alumina source, an alkali source, and a structure directing agent; a ratio of an alkali metal to the structure directing agent being at least 0.33; and a molar ratio of silica to alumina being at least 10 in the raw material composition, wherein the structure directing agent is 1-adamantanamine or a salt thereof.

10. The method for producing the LEV-type zeolite according to claim 9, wherein the raw material composition has the following molar composition:

$SiO_2/Al_2O_3$ ratio: at least 25 and less than 60;
$H_2O/SiO_2$ ratio: at least 5 and less than 50; and
M/SDA ratio: at least 0.33 and at most 2.0.

11. The method for producing the LEV-type zeolite according to claim 9, the method further comprising a metal adding step for adding a transition metal to an LEV-type zeolite and a calcination step for calcining the LEV-type zeolite after the metal adding step.

12. A method for reducing and removing nitrogen oxides comprising contacting an exhaust gas containing nitrogen oxides with the catalyst containing LEV-type zeolite according to claim 1.

* * * * *